United States Patent [19]

Williams

[11] 3,870,884
[45] Mar. 11, 1975

[54] APPARATUS FOR NEGATING EFFECT OF SCATTERED SIGNALS UPON ACCURACY OF DUAL-BEAM INFRARED MEASUREMENTS

[75] Inventor: Paul Williams, Columbus, Ohio

[73] Assignee: Infra Systems, Inc., Columbus, Ohio

[22] Filed: June 26, 1974

[21] Appl. No.: 483,085

Related U.S. Application Data

[63] Continuation of Ser. No. 391,046, Aug. 24, 1973, abandoned.

[52] U.S. Cl.................. 250/339, 250/349, 250/359
[51] Int. Cl. ............................................. G01t 1/16
[58] Field of Search .......... 250/338, 339, 341, 349, 250/350, 358, 359, 360, 272, 273, 274, 560, 571; 356/108

[56] References Cited
UNITED STATES PATENTS

| | | | |
|---|---|---|---|
| 1,917,379 | 7/1933 | Lowry | 250/571 |
| 2,246,501 | 6/1941 | Bradner et al. | 250/560 |
| 2,977,478 | 3/1961 | Wuppermann | 250/272 |
| 3,597,616 | 8/1971 | Brunton et al. | 250/341 |
| 3,693,025 | 9/1972 | Brunton | 250/339 X |

Primary Examiner—James W. Lawrence
Assistant Examiner—Davis L. Willis
Attorney, Agent, or Firm—William T. Fryer, III; Tipton D. Jennings, IV; C. Henry Peterson

[57] ABSTRACT

The embodiment of the subject apparatus disclosed in the present application employs an additional infrared detector which is positioned to detect scattered infrared energy. An infrared filter having a passband including the wavelength of the reference beam but not that of the absorption beam is positioned in front of this detector. The signal derived at this additional detector is thus based only upon scattered infrared energy at the reference wavelength, and is used to oppose the signal derived at the standard detector at the reference wavelength. Further adjustment of the outputs of the detectors is also obtained so that the accuracy of measurement of film thickness is not affected by scatterers in the film or by a change in the number of such scatterers.

10 Claims, 3 Drawing Figures

APPARATUS FOR NEGATING EFFECT OF SCATTERED SIGNALS UPON ACCURACY OF DUAL-BEAM INFRARED MEASUREMENTS

This application is a continuation of application Ser. No. 391,046, filed Aug. 24, 1973, now abandoned.

BACKGROUND OF THE INVENTION

The present invention relates to improvements in the measurement of film properties using a reflection-type, dual-beam infrared measurement system, and more particularly to the elimination of errors caused by scattering of infrared energy from the film being measured.

Gauges which measure the properties of films are well known in the art. For example, it is known to measure the thickness of film being extruded or blown as a continuous hollow column or "bubble" to insure that the thickness remains at a preset value. Normally, the gauge includes an infrared radiation source that emits beams of radiation in two narrow spectral bands toward the film. A portion of the incident radiation is specularly reflected from each of the front and back surfaces of the film. An infrared radiation detector is disposed on the same side of the film as the source and in an angularly oriented relationship thereto such that the specularly reflected radiation inpinges against the receiving surface of the detector. The detector is thus positioned to detect ideally only those radiation components specularly reflected from the front surface of the film, and the rear surface of the film after passage into and out of the film. An electronic signal processing circuit is connected to the output of the detector to provide an indication of the film property being measured, e.g. thickness, or a control signal in the case of an automatic process control system.

The two beams of radiation are at different bands or wavelengths which are selected on the basis that one wavelength, known as the reference wavelength, is relatively unabsorbed by the resin molecules; while the other wavelength, the absorption wavelength, exhibits a relatively high absorption by the resin molecules. A strong absorption wavelength is selected for the absorption signal to provide sensitive gauging of very thin films. As the film changes in thickness, the portion of the infrared energy which passes into the film and is reflected from the rear surface to the detector undergoes a significant change in energy level because of the high absorption characteristics of the film, and provides a basis for high sensitivity of film measurement. The energy specularly reflected off of the front surface of the film contains no information concerning film thickness; however, the energy reflected from this front surface at both the absorption and reference wavelengths is substantially the same and does not adversely affect the measurement.

The processing circuitry connected to the output of the infrared detector typically includes a ratio circuit for taking the electrical ratio of the detected absorption signal to the reference signal. This ratio is proportional to the radiant energy absorbed in the film by the resin molecules and is thus proportional to the thickness of the film. Because a ratio of the two signals is taken, the output is independent of ambient factors, such as variations in the source intensity, which affect both the reference and absorption signals equally.

When measuring clear film, essentially all of the infrared energy is either reflected at the front and back surfaces to the detector or passes out of the back of the film and is lost to the detector. In the case of a colored film which contains a pigment such as titanium dioxide, the particles of pigment create scattering centers which intercept some of the energy passing through the film and scatter it substantially equally in all directions within a hemispherical field. A portion of this energy reaches the detector together with specularly reflected energy to cause a signal to be derived at the detector different from that had the film been clear. The greater the number of scatterers in the film caused by a larger loading of pigment into the plastic melt, then the greater the amount of energy which is reflected back by the scatterers and the greater the amount of scattered energy received by the detector. Additionally, if scattering centers are located behind the film, such as might be caused by smoke trapped within a film bubble in the case of blown film, these scattering centers can also cause energy to be scattered back through the film. A portion of this energy may reach the detector, if the latter is positioned within the hemispherical zone in which the energy is scattered. Because a ratio of the detected absorption and reference signals is obtained in the processing circuit, it would seem likely that any increase in detected energy caused by scattering would be approximately the same for both the reference and the absorbed signals and would cancel. Such is not the case. While the amount of energy reflected by a single scatterer is approximately the same at both the absorption and reference wavelengths, the scattered energy at the reference wavelength is not affected by film thickness but only by the number of scatterers present in the film (and possibly behind the film). On the other hand, the scattered energy at the absorption wavelength is affected both by the number of scatterers and the position of the scatterer in the film (or behind it). The scattered energy at the absorption wavelength is absorbed by any passage through the film, and the amount of scattered energy which reaches the detector is on the average less than in the case of the reference signal. Additionally, the energy which is reflected off of a scatterer does not stricke the back surface of the film and its path length through the film is altered. The amount of absorption by the film is thus different than when there are no scatterers present. The end result is that the ratio of the absorption signal to the reference signal is disturbed, creating a measurement error.

It has been found that for a given thickness of film, an increase in the number of scatterers in the film, such as caused by an increased loading of pigment, causes the film to appear thicker to the measuring circuitry than is actually the case. This is because there is a greater increase in the energy detected at the reference frequency than there is at the absorption frequency.

For a set thickness of film and a set pigment loading, the signal processing circuitry can be calibrated by proper selection of the span or scaling factor to account for the scattering error. This solution has not been found to be satisfactory. One problem is that if the pigment loading is not strictly controlled during film extrusion, or if there is a poor dispersion of the pigment in the plastic film, then the processing circuitry will show an erroneous change in film thickness because of the change in scattering properties of the film. This is particularly troublesome when the output of the processing circuitry is used to automatically control the film thickness. Corrections will be entered into the control signals to correct for what appears to be an error in film thickness when the only problem is in the quantity or dispersion of the color pigments.

Another disadvantage is the need to recalibrate the signal processing circuitry for each change in pigment loading percentage or change in color pigments. Normally, this requires that the automatic control of the manufacturing process be interrupted and the processing circuitry recalibrated to compensate for this change in film scattering properties. The time it takes for recalibration can result in unusable or lower-grade film due to the possibility of a variation from the preset thickness specification, and a resultant loss of profits.

SUMMARY OF THE INVENTION

The present invention overcomes the objects and disadvantages of the prior art by the provision of an improved dual-beam, reflection-type, infrared measuring system having apparatus which substantially compensates for or negates the effect caused by the error-producing presence of scatterers in plastic film during manufacture. By so doing, variations in the quantity or dispersion of the scattering particles have minimal or essentially no affect upon the measurement accuracy of the film property being measured. Planned changes in pigment loading, for example, or from one film color pigment to another, can also be readily undertaken without having to interrupt film manufacture or the automatic control apparatus in order to recalibrate the signal processing circuitry.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and advantages and in accordance with the purpose of the invention, as embodied and broadly described herein, the infrared measuring system of this invention comprises an infrared radiation source for generating first and second beams of infrared energy, each of said beams being at different respective wavelengths, one of said beams being the absorption beam which is selected to undergo greater absorption with respect to the film property being measured than the other beam known as the reference beam, first means positioned with respect to said source for detecting energy from said beams specularly reflected from the front and rear surfaces of said film, as well as beam energy scattered from the film, second means positioned with respect to said source for detecting energy from said beams scattered from the film but not detecting energy specularly reflected from the film surfaces, an infrared filter positioned with respect to said second detecting means to intercept energy scattered from the film toward said second detecting means, said filter having a passband which permits the passage of scattered energy at the wavelength of the reference beam but not at the wavelength of the absorption beam, means for processing the detected energy to provide a ratio measurement of the detected signals corresponding to the detected absorption and reference beams, said processing means including means responsive to the output of said second detecting means for substantially negating the effect of scattered energy received at said first detecting means.

The invention consists in the novel circuits, parts, constructions, arrangements, combinations, and improvements shown and described. The accompanying drawings, which are incorporated in and constitute a part of the specification, illustrate one embodiment of the invention and, together with the description, serve to explain the principles of the invention.

DESCRIPTION OF THE PREFERRED EMBODIMENT

Reference will now be made in detail to the present preferred embodiment of the invention, an example of which is illustrated in the accompanying drawings.

Figure 1:
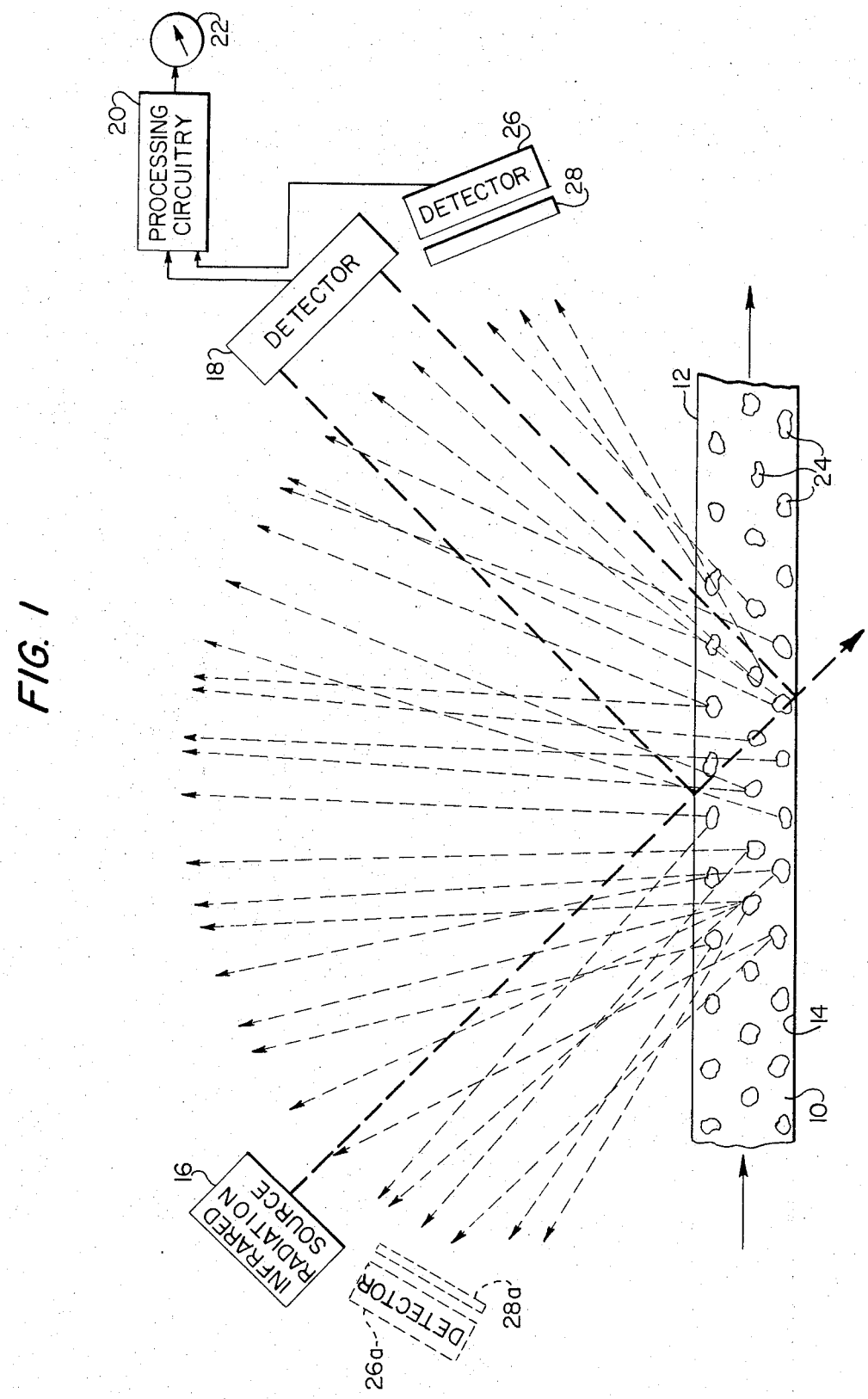
FIG. 1 is a diagrammatic view of a dual-beam, reflection-type infrared measurement system embodying an additional detector in accordance with the preferred teachings of the present invention.

Referring now to FIG. 1, there is shown a reflection-type, dual-beam, infrared measuring system diagrammatically illustrated with respect to a single layer, sheet form material 10. In the present description, it will be assumed that material 10 is a blown plastic film which is extruded in a continuous cylindrical form, or "bubble" as commonly termed in the art. It is the objective of the infrared measuring system to determine a property of the film 10 which, in the present description, will be the thickness of the film. The measuring system output thus provides an indication of the thickness of the film being manufactured and preferably utilizes the output as a process control signal to maintain the thickness of the film at a preset value. The film 10 is made of a material which permits the passage therethrough of infrared radiation and has a specularly reflective front surface 12 and a specularly reflective inside back surface 14 from which a portion of the infrared energy is reflected and detected as described hereinafter. The film can be an organic polyethylene material, merely as an example since other types of film material can be measured provided they meet the requirement of being transmissive of infrared energy and possessing specularly reflective front and back surfaces.

Apparatus for generating the necessary infrared radiation and subsequently detecting the reflected energy is only diagrammatically illustrated in FIG. 1 because the structure is well known in the art for measuring a property of a film by the use of infrared absorption phenomena. As shown, the dual-beam reflection type system includes an infrared radiation source 16 which is capable of generating first and second beams of infrared energy, each being at different respective wavelengths. One of said beams is termed the absorption beam and is selected to undergo greater absorption with respect to the film property, e.g., thickness, being measured than the other beam known as the reference beam. The two discrete beams of infrared radiation are directed from the source 16 toward the front surface 12 of film 10.

Preferably, while the two beams of infrared energy are directed along the same path (as shown by the heavy broken line), they are not simultaneously transmitted, but are spaced in time. U.S. Pat. No. 3,089,382, incorporated by reference herein, is illustrative of a type of dual-beam infrared radiation generating apparatus which can be utilized for producing the two time-spaced beams of energy for making a reflection-type measurement. Briefly, this type of apparatus preferably includes an infrared radiation source for producing broad band radiation which is positioned to direct the emitted infrared radiation toward the film. The radiation is caused to pass through filter elements which are alternately interposed in the path of the radiation to form the two discrete beams of radiation. These filter elements, which are of the narrow bandpass type, are mechanically supported in the path of radiation by means such as a revolving wheel to alternately produce the two time-separated beams of radiation.

The wavelengths of the passband for each filter element is determined by the specific film material and the property of interest. One beam, the absorption beam, is at a wavelength or narrow band of wavelengths selected to exhibit a characteristic resonance absorption by the resin molecules in the film, while the other beam of radiation, which is termed the reference beam, is at a selected wavelength or narrow band of wavelengths that is either not affected by the resin molecules or which exhibits a much lesser degree of absorption than the absorption beam. Accordingly, the two beams of radiation are subject to differing effects as a consequence of reflection at the rear surface 14 of the film due to absorption of one beam by passage in and out of the film 10. This difference is detectable by an appropriate processing system, also well known in the art, to provide the desired output signal.

Positioned with respect to source 16 are first means for detecting energy from the beams specularly reflected from the front 12 and rear 14 surfaces of film 10. As embodied herein, detector 18 is disposed at a predetermined angular configuration relative to the source 16 so that infrared energy reflected from both the front and rear surfaces of film 10 will impinge upon the radiation sensitive surface of detector 18. Detector 18 is of a known construction and provides an output signal proportional to the level or intensity of detected energy.

Both beams of radiation from source 16 travel along the same path toward film 10 and are incident to the specular front surface 12 of the film. This reflected energy takes a path determined by the angle of reflection which is equal to the angle of incidence of the energy from source 16, with respect to a normal to the surface 12 at the point of incidence. Detector 18 is positioned in the path taken by that portion of the radiation which is specularly reflected at this front surface. Only a small percentage of the radiation incident to the front surface 12 is reflected at that surface, and most of the energy in each beam of radiation enters film 10 and is incident to the specular back surface 14. A similar percentage of each beam incident to the back surface 14 is reflected therefrom at an angle equal to the angle of incidence with respect to a normal to the surface 14 at the point of incidence. The remainder of the energy contained in the beams exits film 10 at this back surface 14 and is lost to the detector. Detector 18 is of sufficient size to be also positioned along the reflection path from the back surface 14 so as to intercept and thereby detect also the energy reflected from this back surface.

There are also means provided herein for processing the detected energy to provide a ratio measurement of the detected signals corresponding to the detected absorption and reference beams. As embodied herein, processing circuitry 20 is diagrammatically illustrated as being connected to the output of detector 18 to process the absorption and reference signals to provide an output ratio measurement. The latter can be observed on a readout device such as indicator 22 or used in a process control loop (not shown) to control the property of the film 10 being measured.

Processing circuitry 20 for processing absorption and reference signals such as provided by detector 18 are well known in the art and generally include amplifying and switching circuitry, the latter functioning in timed relationship to the operation of the source 16 in generating the two discrete beams of radiation. In this manner, the processing circuitry 20 can continuously and alternately process the two discrete detected signals and apply them to a comparing circuit such as a ratio circuit to obtain the desired output. A general block diagram of this form of processing circuit synchronized with the operation of a radiation source, are shown in the aforementioned U.S. Pat. No. 3,089,382, as well as U.S. Pat. Nos. 3,693,025 and 3,551,678, all of which provide an output ratio of absorption to reference signals. As long as this output ratio signal remains fixed at a preset or predetermined value in the present case, then it will be known that the thickness of the film is being maintained at the desired value. Should this output ratio vary, it will be indicative of a change in thickness of the film and steps can be taken manually or automatically to modify the film processing equipment in order to return the film to the desired thickness.

In the foregoing description of the processing circuitry, it was assumed that film 10 was clear or free of scatterers. In the case of colored film, it is common to use pigments which are dispersed in the film during manufacture. As discussed earlier, the particles of pigment in the film act as scattering centers upon the incident infrared energy as the film moves past the source-detector position. Each scattering center when irradiated by such energy acts to diffusely reflect or scatter this energy in a substantially uniform manner over an approximately 180° surface back toward the incident radiation path.

This phenomena is diagrammatically illustrated in FIG. 1. Here particles of pigment, identified at 24, are shown dispersed through the film 10. Although the infrared radiation from source 16 is usually focused upon the moving film 10, there is some natural dispersion of the beam, even though this is not shown in FIG. 1. Thus, the radiation beams from the source 16 are incident to the surfaces 12 and 14 in a narrow range of angles of incidence although the reflected energy is nevertheless substantially all intercepted by the detector 18. In the presence of pigment particles 24, the beams of the radiation which enter the film 10 impinge upon numerous pigment particles 24 causing a widespread scattering of the infrared radiation upwardly through the film and passing out of its front surface 12. This is shown in somewhat exaggerated fashion in FIG. 1.

The reflection off of the front surface 12 is, of course, not scattered and that portion of the energy which is reflected passes undisturbed to detector 18. Within the film, however, the scatterers 24 intercept a part of the incident radiation, depending upon the density or number of scatterers present in the film. Because there is some interception of the incident energy a reduced level of energy is incident upon the rear surface 14 and accordingly a reduced portion of that incident energy is reflected to detector 18. Furthermore, some of the energy reflected off of the rear surface 14 may also strike scatterers 24 in its return path, thus causing further reduction of the energy which reaches the detector 18.

The energy which is scattered by the particles 24 is, as mentioned previously, assumed to be scattered essentially equally in all directions within a substantially hemispherical zone. Because the sensitive surface of detector 18 is, as shown, facing the film, any scattered energy which comes within its field of view is received by the detector and processed in circuitry 20. Furthermore, should there be any scatterers such as smoke particles behind the film 10, that is within the film bubble when such is being manufactured, any energy scattered back toward the source 16 and detector 18 will pass back through film 10. If any of this energy comes within the field of view of detector 18, it is received and processed the same as energy scattered by particles within the film 10. Thus, although there is a reduction in the energy reflected from the rear surface and received by the detector 11, there is an added energy due to the scattering effect of the pigment particles 24.

When the reference beam is being transmitted by source 16 the energy which is received by detector 18 in the presence of scatterers 24 in the film is affected only by the number of scatterers or density of scatters which are present. In regard to the absorption beam, however, the energy received by detector 18 is affected both by the number of scatterers and the position of each scatterer that contributes scattered energy to the detector. This is readily understood because if the scatterer 24 is just below the front surface 12 then the path of travel of energy into and out of the film is less than where the scatterer is adjacent to the back surface 14. Obviously, in the former case there is less absorption than in the latter because of the smaller path length through the film. The result is that the presence of the scatterers 24 does not affect the level of the energy detected by detector 18 equally for both the reference and absorption beams. An error now occurs at the output of the processing circuitry 20 due to the presence of the scatterers 24.

In accordance with the invention, second means have been provided which are positioned with respect to the source 16 for detecting energy from the beams scattered from the film 10, but not detecting energy specularly reflected from the film surfaces. As embodied herein a second detector 26, preferably of the same construction as detector 18, is mounted so as to be out of the path of the energy reflected from the front and back surfaces 12 and 14. However, detector 26 is positioned so as to receive essentially the same level of scattered energy as detector 18. There are two alternative preferred positions for mounting detector 26 shown in FIG. 1, both of which are at a reflection angle other than that angle of reflection equal to the angle of incidence of the generated beams. The first position is at a lower angle of reflection than that of detector 18 so as to avoid receiving the signals reflected off the film surfaces but to receive essentially the same scattered energy. The second position is shown in phantom outline as detector 26a positioned on the opposite side of the source 16 from detector 18. The positioning of detector 26a is such that it is also within the hemispherical scattering zone of scatterers 24 so that substantially the same level of scattered energy is received by detector 26a as is received by detector 18.

In accordance with the invention, an infrared filter is positioned with respect to said second detecting means to intercept energy scattered from the film toward said second detecting means, said filter having a passband which permits the passage of scattered energy at the wavelength of the reference beam but not at the wavelength of the absorption beam. As embodied herein, a bandpass filter 28 is shown positioned in front of detector 26 so as to intercept the energy which is scattered by the scatterers in the film 24, or by any scatterers positioned behind the film as previously described. The passband of filter 28 is preferably selected to have the same passband as the filter (not shown) commonly employed in source 16 as earlier discussed that creates the reference beam. Only the energy scattered at the wavelength of the reference beam passes through filter 28 to reach detector 26, and energy at other wavelengths within the infrared spectrum, and particularly at the wavelength of the absorption beam, is blocked by filter 28. When the alternative detector 26a is used, a filter 28a of the same construction as filter 28 is positioned in front of the latter detector to form the same function as filter 28.

As mentioned previously, the energy of the reference beam in the presence of scattering centers 24 is affected only by the number of scatterers in the film and is unaffected by film thickness. By providing a filter 28 which passes only the reference wavelength, the energy level detected by detector 26 is thus a measure of the number of scatterers in the film. This information can now be used in correcting the error created by the application of scattered energy to detector 18. To this end, the output of detector 26 is also applied to the processing circuitry 20.

Figure 2:
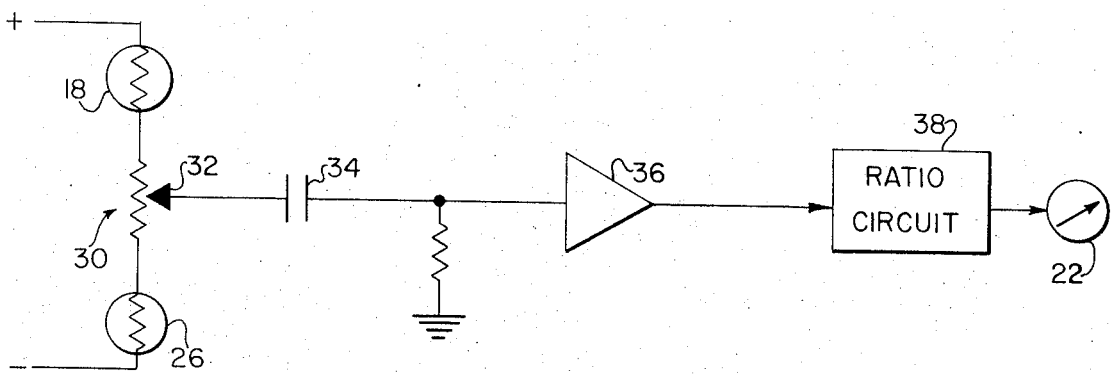
FIG. 2 is a schematic and block diagram view of the preferred construction of the processing circuitry of FIG. 1.

With reference now to FIG. 2, a preferred embodiment of the processing circuitry 20 is shown in a partially schematic and partially block diagram form. In accordance with the invention, the processing means includes means responsive to the output of the second detecting means for substantially negating the effect of scattered energy received at the first detecting means. As embodied herein, the second detecting means is shown as a detector 26, represented by a resistor whose impedance varies depending on the intensity of the received scattered radiation at the reference wavelength. Similarly, detector 18 is represented as a resistor whose impedance varies depending on the level or intensity of received radiation, both by scattering and specular reflection, at both the reference and absorption wavelengths.

A circuit is formed in which the two detector impendances are connected in series as a voltage divider between the terminals of a potential source. Preferably, the positive terminal of the source is connected to one side of detector 18 and the negative terminal of this source is connected to one side of detector 26. The voltage divider also includes a potentiometer 30 connected between the two detectors. The movable tap 32 of the potentiometer is connected to a DC blocking capacitor 34 and the opposite side of this capacitor is connected to a preamplifier 36. The output of amplifier 36 is connected into a ratio circuit 38, the output of this ratio circuit forming the output of the processing circuitry which is applied to indicator 22.

In the measurement of clear film where there is an absence of scatterers 24, the detector 26 remains at a constant high impedance value while only detector 18 changes in value in response to receipt of the reflected beams of energy at the absorption and reference wavelengths. These pulsed signals vary the impedance of detector 18 in proportion to the intensity or level of energy received to create pulsed absorption and reference signals, which are passed through capacitor 34 and amplifier 36 to the ratio circuit 38 where they are processed to provide an output ratio signal in accordance with prior art techniques.

In the thickness measurement of film containing scatterers, such as dispersed pigment particles, the operation of FIG. 2 differs. Therefore prior to initiation of film manufacture, the ratio circuit 38 is calibrated in a standard manner with respect to a clear film sample having the desired thickness, so that the indicator 22 reads the correct thickness of this clear film. This establishes the ratio of the absorption to the reference signal for this film thickness. During this calibration, detector 26 remains at a fixed high impedance value because of the absence of scatterers in the sample film. A sample of colored film containing scatterers and of the same thickness as the clear sample is now used to calibrate the processing circuit. In this second calibration, because of the effect upon the detected absorption and reference signals due to scattering, the ratio is disturbed and an error occurs in the reading at 22. The action of detector 26 and the adjustment of tap 32 serve to restore the ratio and thereby negate the error caused by scattering.

This can be better understood by the following explanation. During emission of the reference beam by source 16, the energy received at detector 18 lowers the impedance of this detector in proportion to the intensity of detected radiation caused both by specular reflection from the front and back film surfaces and scattered radiation caused by the pigment particles 24. Detector 26, however, causes a drop in impedance only in proportion to the intensity of the scattered radiation which is received at detector 26. The voltage at tap 32 would ordinarily rise if there was a drop in impedance of detector 18 caused by receipt of scattered energy; however, because detector 26 is affected in the same manner as detector 18 by scattered energy, its effect upon the voltage at tap 32 is opposite to that of detector 18 and acts to lower the voltage at this tap. The combined effect of the change in voltages in response to changes in impedances of detectors 18 and 26 due to scattered signals is to neutralize one voltage by the other.

When the absorption beam is being received at detector 18 it undergoes a drop in impendance in proportion to both the specularly reflected energy and the scattered energy which is received by this detector. The impedance of detector 26 is unchanged because filter 28 blocks the scattered absorption beam from reaching detector 26. Because there is no opposing signal as when the reference beam is being received, tap 32 is adjusted to change the levels of both the absorption signal and reference signal provided at tap 32 until the ratio is restored by return of the reading at indicator 22 to the known thickness of the sample. Thereafter, if there is any change in the number of scatterers in the film, the ratio is unchanged because of the proportionality of the relationship between absorption and reference signals established at tap 32; and the reading provided by indicator 22 is a true indication of thickness.

Figure 3:
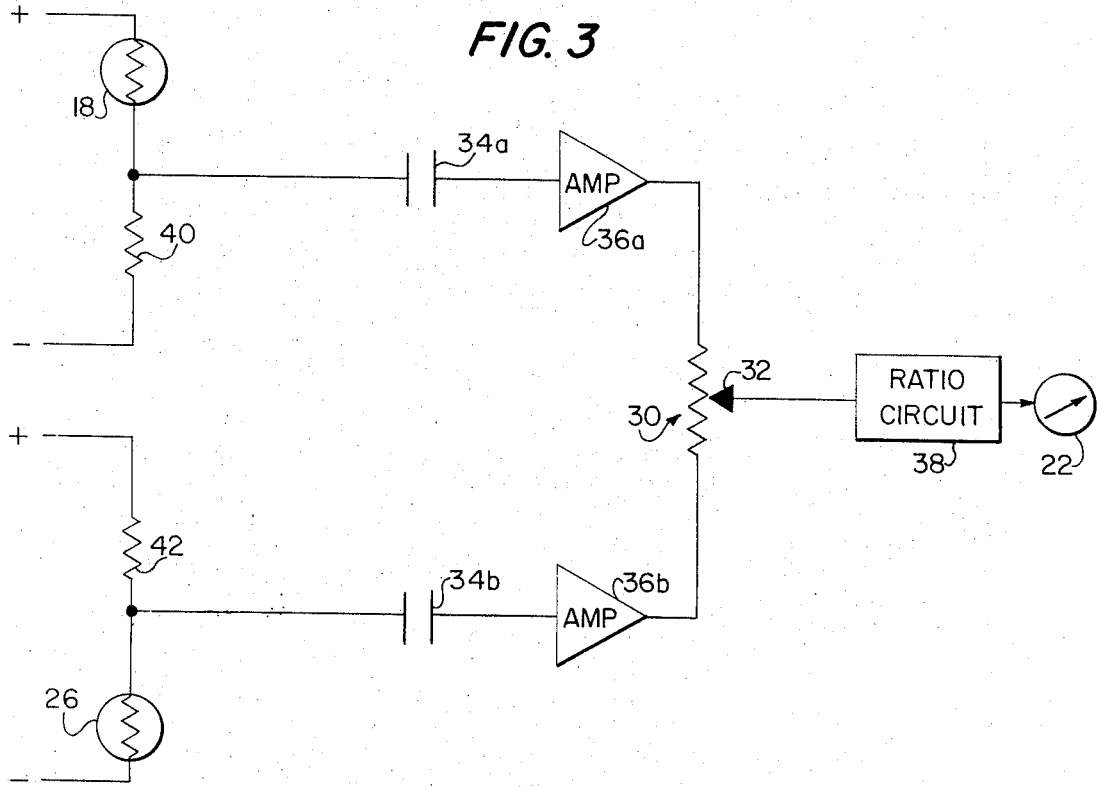
FIG. 3 is a schematic and block diagram view of an alternative preferred construction of the processing circuitry of FIG. 1.

An alternative preferred embodiment of the processing circuitry 20 is shown in FIG. 3 in a partially schematic and partially block diagram form. As embodied herein, detectors 18 and 26 are connected in a pair of separate detecting circuits in series with load resistors 40 and 42, respectively. The output of detector 18 is applied through capacitor 34a and amplifier 36a to one side of potentiometer 30. Similarly, the output of detector 26 is applied through capacitor 34b and amplifier 36b to the opposite side of potentiometer 30. Variable tap 32 applies the voltage developed at this tap to the ratio circuit 38 whose output can be read at 22 as film thickness and used as an automatic process control signal, as mentioned earlier.

The operation of FIG. 3 is very similar to that of FIG. 2. After calibration with a clear film sample and a scattered film sample, both having the same target thickness, the voltage pulses derived at tap 32 are free of the effect of error caused by the presence of scatterers. The reading at 22 after processing by the ratio circuit 38 gives a true reading of the thickness of the film being manufactured.

In operation, the decrease in impedance of detector 18 in response to detected absorption and reference beams, both specularly reflected and scattered, causes positive output voltage pulses to occur at the junction of this detector and its load resistor 40. The decrease in impedance of detector 26 in response to scattered and detected reference beams causes negative output voltage pulses to occur at the junction of this detector and its load resistor 42. After amplification, all pulses are applied to potentiometer 42. The synchronously created positive and negative reference pulses appear as opposing voltage pulses at opposite ends of potentiometer 30. This potentiometer acts as a difference circuit in which the output is proportional to the difference between the two input signals applied by the detectors 18 and 26.

As in the case of FIG. 2, the effect of scattering is neutralized at the reference wavelength. The setting of tap 32 in the potentiometer restores the proper proportionality between the absorption pulses and the compensated reference pulses. The readings obtained on indicator 22 are true thickness measurements substantially free of error caused by the scattering properties of the film.

The measuring apparatus of this invention offers a unique advantage in continuous film manufacture by accommodating both inadvertent and planned changes in the scattering properties of the film without error and without having to terminate either manufacture or the automatic process control system. Regardless of whether there is an unevenness of color caused by poor dispersion of pigment, a planned or unplanned change in the intensity of the color caused by a change in the number of pigment particles, or planned changes of color by injecting a new scattering pigment into the film, scattering errors are automatically negated and accurate production continues unabated.

It will be apparent to those skilled in the art that various modifications and variations could be made in the

What is claimed is:

1. A dual-beam, reflection-type infrared measuring system for measuring a property of a film by the use of infrared absorption phenomena comprising:
   a. an infrared radiation source for generating first and second beams of infrared energy, each of said beams being at different respective wavelengths, one of said beams being the absorption beam which is selected to undergo greater absorption with respect to the film property being measured than the other beam known as the reference bean,
   b. first means positioned with respect to said source for detecting energy from said beams specularly reflected from the front and rear surfaces of said film, as well as beam energy scattered from the film,
   c. second means positioned with respect to said source for detecting energy from said beams scattered from the film but not detecting energy specularly reflected from the film surfaces,
   d. an infrared filter positioned with respect to said second detecting means to intercept energy scattered from the film toward said second detecting means, said filter having a passband which permits the passage of scattered energy at the wavelength of the reference beam but not at the wavelength of the absorption beam,
   e. means for processing the detected energy to provide a ratio measurement of the detected signals corresponding to the detected absorption and reference beams,
      1. said processing means including means responsive to the output of said second detecting means for substantially negating the effect of scattered energy received at said first detecting means.

2. An infrared measuring system as claimed in claim 1, wherein:
   a. said first detecting means undergoes a change in impedance proportional to the intensity of received infrared energy, and said second detecting means undergoes a change in impedance proportional to the intensity of scattered energy received at the wavelength of the reference beam, and
   b. said negating means includes a circuit having a potential source and a voltage divider including said first and second detecting means connected in series with said source, the change in voltage at the output of said second detecting means opposing the change in voltage at the output of said first detecting means in response to changes in impedance caused by receipt of scattered energy at the wavelength of the reference beam.

3. An infrared measuring system as claimed in claim 2, wherein:
   a. said negating means further includes a potentiometer connected between the two detecting means, said potentiometer having a movable tap.

4. An infrared measuring system as claimed in claim 3, wherein:
   a. said processing means further includes a ratio circuit responsive to the output of said movable tap, and an indicator connected to the output of said ratio circuit.

5. An infrared measuring circuit as claimed in claim 1, wherein:
   a. said second detecting means is positioned at a reflection angle with respect to said source other than that angle of reflection equal to the angle of incidence of the generated beams.

6. An infrared measuring system as claimed in claim 1, wherein:
   a. said first detecting means undergoes a change in impedance proportional to the intensity of received infrared energy, and said second detecting means undergoes a change in impedance proportional to the intensity of scattered energy received at the wavelength of the reference beam, and
   b. said negating means includes a difference circuit connected to the output of said first and second detecting means, the change in voltage at the output of said second detecting means opposing the change in voltage at the output of said first detecting means.

7. An infrared measuring system as claimed in claim 6, wherein:
   a. said negating means further includes a pair of detecting circuits, each containing a separate one of said first and second detecting means, and
   b. said difference circuit includes a potentiometer connected to the output of said first and second detecting means, said potentiometer having a movable tap.

8. An infrared measuring system as claimed in claim 7, wherein:
   a. said processing means further includes a ratio circuit responsive to the output of said movable tap, and an indicator connected to the output of said ratio circuit.

9. An infrared measuring circuit as claimed in claim 6, wherein:
   a. said second detecting means is positioned at a reflection angle with respect to said source other than that angle of reflection equal to the angle of incidence of the generated beams.

10. A dual-beam, reflection-type infrared measuring system for measuring a property of a film by the use of infrared absorption phenomena comprising:
    a. an infrared radiation source for generating first and second beams of infrared energy, each of said beams being at different respective wavelengths, one of said beams being the absorption beam which is selected to undergo greater absorption with respect to the film property being measured than the other beam known as the reference beam,
    b. first means positioned with respect to said source for detecting energy from said beams specularly reflected from the front and rear surfaces of said film, as well as beam energy scattered from the film,
    c. means for processing the detected energy to provide a ratio measurement of the detected signals corresponding to the detected absorption and reference beams,
       1. said processing means including second means positioned with respect to said source for detecting energy from said beams scattered from the film but not detecting energy specularly reflected from the film surfaces and responsive to the scattered energy at the wavelength of the reference beam but not at the wavelength of the absorption beam, for substantially negating the effect on said ratio measurement of scattered energy received at said first detecting means.

* * * * *